Oct. 8, 1968   J. F. MILNE ETAL   3,405,392
ELECTRONIC CALCULATORS
Filed April 30, 1965   8 Sheets-Sheet 6

Oct. 8, 1968  J. F. MILNE ET AL  3,405,392
ELECTRONIC CALCULATORS
Filed April 30, 1965  8 Sheets-Sheet 7

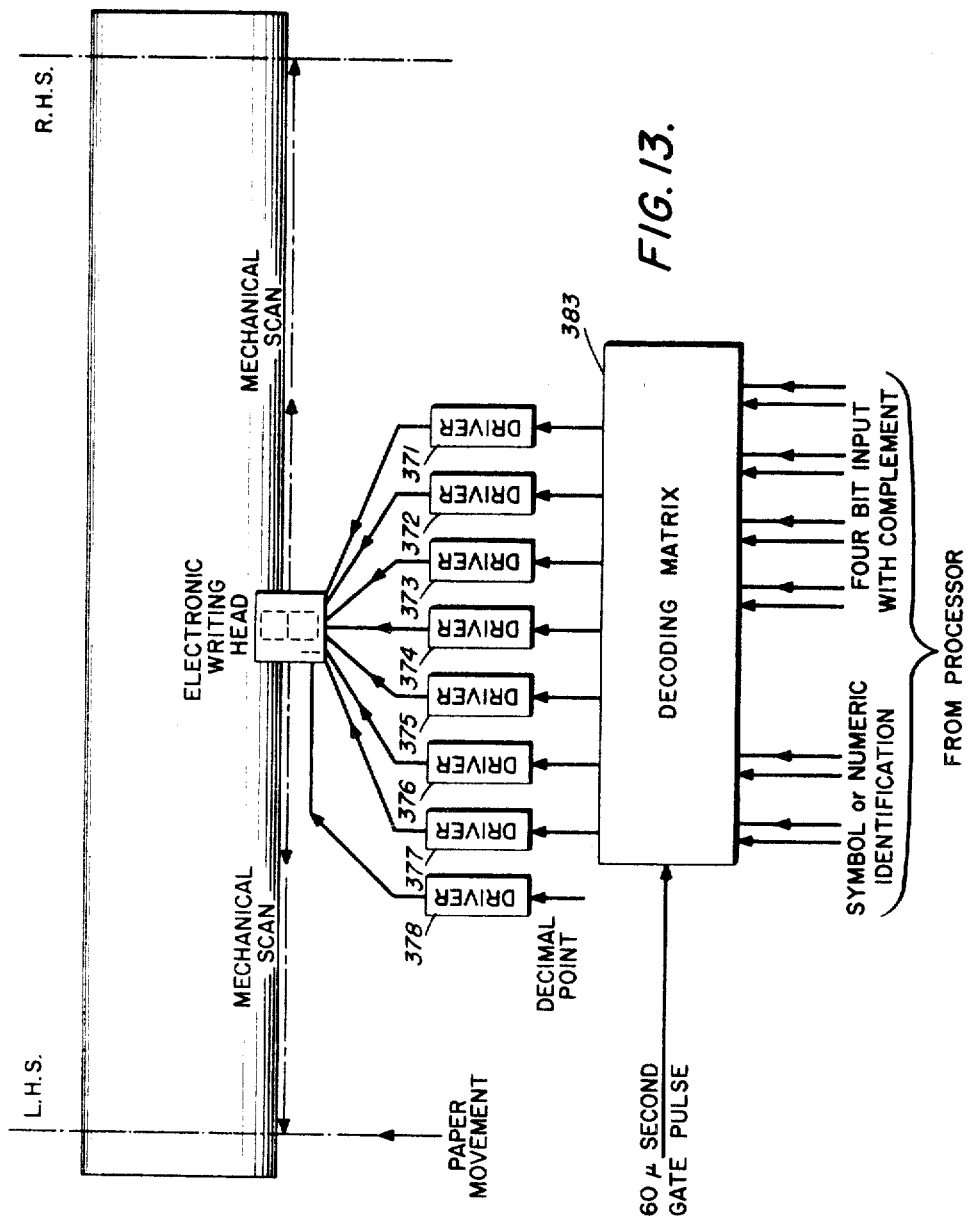

United States Patent Office 3,405,392
Patented Oct. 8, 1968

3,405,392
ELECTRONIC CALCULATORS
James F. Milne, Penfield, N.Y., and Shimshon Zur, Fairfield, Conn., assignors to Sperry Rand Corporation, New York, N.Y., a corporation of Delaware
Filed Apr. 30, 1965, Ser. No. 452,218
21 Claims. (Cl. 340—172.5)

ABSTRACT OF THE DISCLOSURE

An electronic desk calculator of the print out variety having a decimal preselect dial and rotating shutter means settable by the dial for detecting the position along the print out span at which a decimal should be printed and providing a signal to cause printing of the decimal at the preselected position. The decimal preselect dial also selects the number of decimal places to the right of the decimal place required to accommodate certain arithmetic functions. Means are provided for counting each digit entered into the calculator after depression of the decimal point key. If the number of decimal digits entered via the keyboard does not equal the number selected on the decimal preselect dial, zeroes are automatically entered into the calculator until all the decimal positions are filled.

---

The present invention relates in general to electronic calculators and more particularly to means in such calculators for providing automatic alignment of data around the decimal point, and insertion and suppression of nonsignificant zeroes to the right of the decimal point. The invention additionally provides means for insuring proper decimal point alignment during printing.

In electronic calculators which perform such arithmetic functions as addition, subtraction, multiplication and division, it is desirable to provide for automatic decimal control within the calculator especially so that those utilizing the device will not need special training or skill to determine the decimal point position.

It is also desirable in such calculator devices to provide some means in conjunction with the printing mechanism to insure printing of the decimal point for each numeric representation at the proper position between the least significant integer and the most significant decimal position regardless of inaccuracies in the mechanical printing mechanism.

In accordance with the invention a decimal preselect dial is provided on the calculator keyboard by which the number of significant decimal digits desired for each numeric representation may be set. The number of digits entered into the calculator to the right of the decimal point, i.e., subsequent to depression of the decimal key, is counted. Then, as a first step to each function performed in the calculator, a determination is made by comparison of this count with that set on the decimal preselect dial as to whether a sufficient number of zeroes has been entered to fill all of the required decimal places. If sufficient zeroes have not been entered, the control system in accordance with the instant invention inserts zeroes automatically until all decimal positions are filled.

In order to provide sufficient decimal places in the accumulators to accommodate multiplication and division functions, numbers are automatically entered into the accumulator registers with twice the required number of decimal positions. As a result, means must be provided when extracting data for printing or shifting data to another register for suppressing nonsignificant zeroes. This is carried on automatically in accordance with the instant invention.

In accordance with the instant invention means is also provided for insuring accurate decimal point printing. By means of a rotating shutter the instant at which the printer reaches the position for decimal printing is detected and an electrical signal is generated in response to this detection, which signal is then applied in synchronism with a print signal to initiate printing of the decimal point. The detection is controlled by the setting of the decimal preselect dial to accurately determine the decimal position.

It is therefore an object of the instant invention to provide a calculator of the type described including means for automatically aligning data therein with respect to the decimal point position.

It is another object of the instant invention to provide a calculator of the type described including means for accurate printing of the decimal point between the least significant integer and most significant decimal position for each number printed.

It is a further object of the instant invention to provide a calculator of the type described including means for automatically inserting nonsignificant zeroes to the right of decimal position eliminating the need to manually insert such zeroes through the keyboard.

It is still another object of the instant invention to provide a calculator of the type described including means by which the number of significant places to the right of the decimal point may be determined automatically for each function through setting of a decimal preselector indicator.

These and other objects, features, and advantages of the present invention will become more obvious from the following description when taken in connection with the accompanying drawing which shows, for purposes of illustration only, an embodiment of the instant invention wherein:

FIGURE 13 is a schematic block diagram of the printer drive circuiting utilized with the printing arrangement of FIGURE 10.

Figure 1:
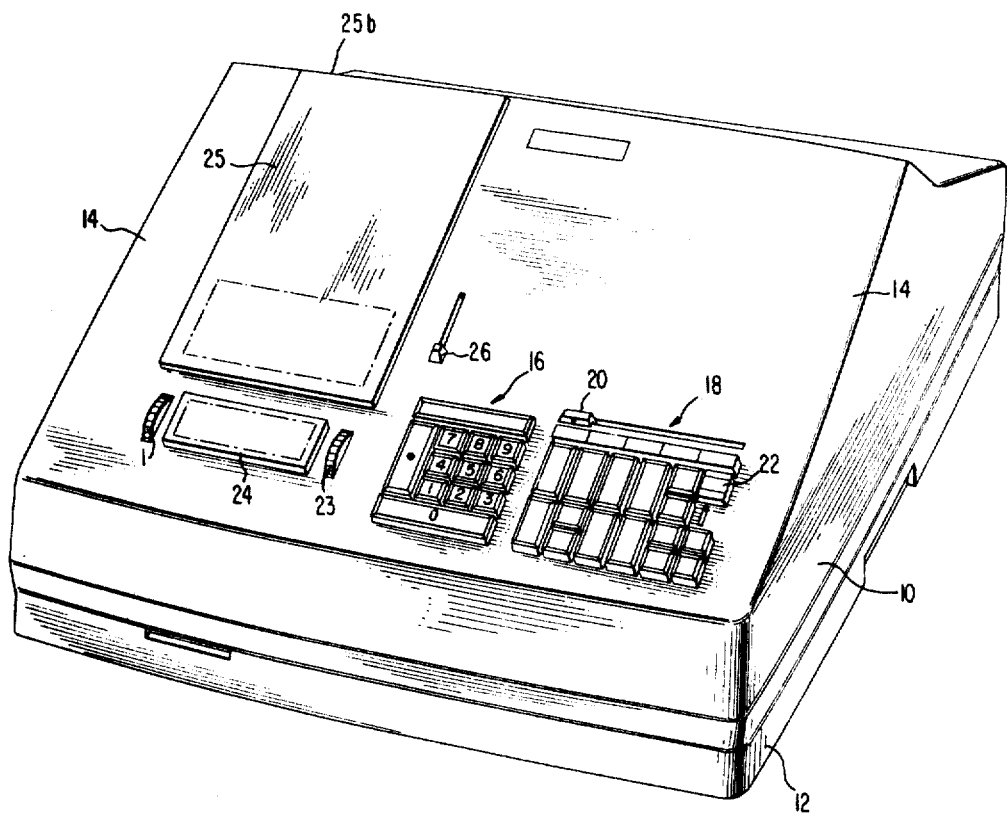
FIGURE 1 is a top plan view of a calculator in which the decimal control system of the instant invention may be used.

The exemplary embodiment of the electronic desk calculator in which the decimal point indicator of the instant invention may be used, illustrated in FIGURE 1, is provided with a casing or cover 10 which is mounted upon and locked to the base 12 of the machine in any conventional manner subject to easy removal so as to effectively isolate the internal mechanism of the calculator during normal operation from outside contact and accidental damage. The inclined front panel or keyboard 14 is divided into four general areas which provide keys, indicators, and other elements necessary to the operation of the calculator. Each of the keys provided by the calculator are positioned on the keyboard at a location which is most accessible and natural for ease of operation of the device.

The keyboard 14 provides a plurality of data entry keys in the form of a ten key arrangement generally designated 16 in FIGURE 1. To the left of the data entry keys 16 on the keyboard 14 there is provided a group of keys consisting of list keys, calculator keys and various nonarithmetic keys generally designated 18 through which selective operation upon the data entered through the data entry keys 16 is initiated.

Immediately above the group of keys 18 on the keyboard there is provided a second accumulator control lever 20 through which the calculator may be set to automatically accumulate totals, products, and quotients within the second accumulator totals. The accumulator control 20 is complemented by control lever 22 included in the group of keys 18. The control lever 22 serves to select between primary use of the main or the auxiliary accumulator included within the main memory of the logic system. Through proper setting of the control levers 20 and 22 a plurality of selective functions may be performed by the calculator materially increasing the versatility of the device over presently known devices of a much more complicated nature.

At the extreme left hand portion of the keyboard 14 there is provided in accordance with the invention a decimal point selector control 23 and a column indicator dial 24 which serve to set the maximum number of decimal places and indicate the number of digits entered into the memory, respectively. Above the column selector dial 24 on the keyboard 14 there is provided a window arrangement 25 beneath which the paper tape, upon which the data introduced into the calculator and the results of the arithmetic operations are printed, is passed out of the machine being visible through the window 25 for each line that is printed. A control lever 26 to one side of the window 25 provides for manual paper advance allowing the paper to be advanced beyond the upper edge 25b of the window 25, where it may be pulled out and torn off.

Figure 2:
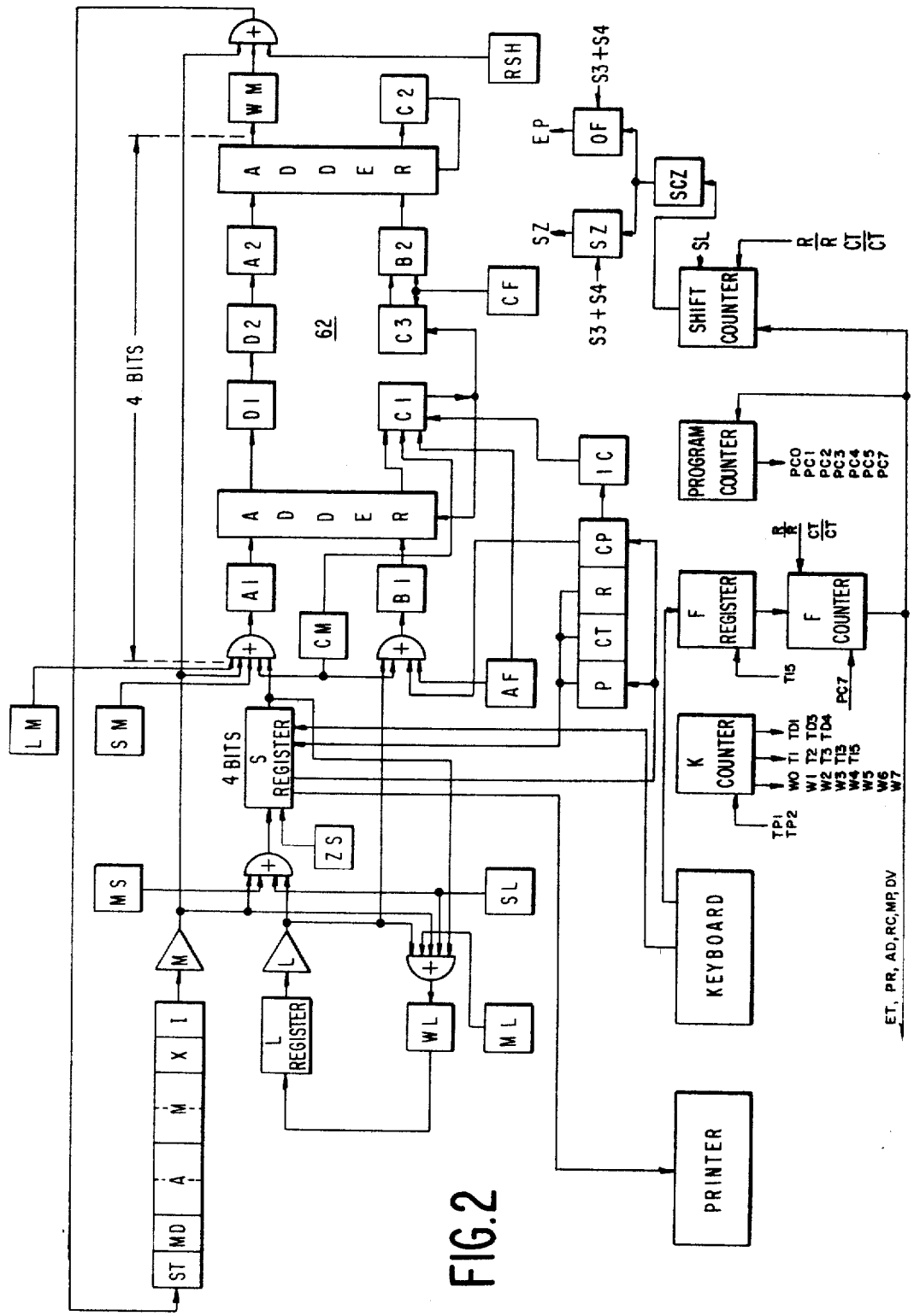
FIGURE 2 is a schematic block diagram of the logic system of the exemplary calculator of FIGURE 1 including a portion of the invention relating to decimal point control during arithmetic operations.

Looking more in detail to the keys 16 and 18 provided on the keyboard 14 particularly with regard to the introduction of data into the machine through the keys 16 and the initiation and control of machine operation through the keys and controls 18, as seen in FIG. 2, data entry is achieved through ten numeric keys 0–9 and and a decimal key 11. Depression of a numeric key causes the digit to enter into the least significant digit location in the input register of the main memory in the form of an appropriate four bit binary number. Subsequent depressions of any numeric key shifts the previous entry to the next higher digit location within the input register and enters the value of the last key depressed into the least significant digit location of that register. Depression of the decimal key indicates that subsequent depressions of any numeric key will be to the right of the decimal point, i.e., the decimal key indicates the separation between the least significant integer and the most significant decimal in a manner to be described more fully hereinafter.

A correction key 13 also is provided among the group of keys 16, which key generates a correction signal clearing the input register of the main memory.

Among the group of keys 18 there is provided several list keys which initiate the list problems including addition "+," subtraction "—," total (T), and subtotal (ST). These list problems may be carried out in either the main accumulator or the auxiliary accumulator of the main memory by selecting one or the other accumulator via control lever 22.

The memory in the calculator consists of two dynamic magnetostrictive delay lines, referred generally hereinafter as the main memory and the auxiliary memory or L register. The main memory consists of a delay line 60 in series with a four bit adder network 62 (FIGURE 2) and has a total capacity of 480 bits. The normal circulation path as seen in FIGURE 2 is through the adder network where information pulses are regenerated for continued storage, or new information pulses are gated into the line. The 480 bits in the main memory are grouped into eight 15 digit words, each digit consisting of four bits. The words are designated as word zero (W0) through word seven (W7). Digit times are referred to as T1 through T15 and bit times as TD1 through TD4. The time required for a bit of information to complete one memory circulation through the main memory path is 4.80 milliseconds.

Since each word in the main memory can be considered as a register occupying this portion of the memory, the delay line 60 in FIGURE 2 is illustrated as providing six registers in timed space relationship. Word zero (W0) is utilized as the input register I. Word one (W1) is not utilized, and words two and three (W2 and W3) are utilized as the main accumulator or accumulator M. Words four and five (W4 and W5) represent the A register, or auxiliary accumulator; while word six (W6) serves as the MD register or multiplicand/divisor register. Word seven (W7) is utilized as a storage register.

The auxiliary memory or L register consists of a magnetostrictive delay line 60a having a capacity of 120 bits, which are grouped into two 15 digit words, each digit consisting of four bits. The L register is used mainly for data transfer, with data being transferred in a character serial bit serial manner between any register of the main memory and the L register, and vice versa. Depending upon the function selected through keyboard control, the data in the L register may be algebraically added to one of the two accumulators in the main memory; in all arithmetic operations, the L register contains at least one of the factors involved. By inserting a four bit shift register S, in series with the L register, data may be shifted to the left one digit at a time. The feature is used to align the data around the decimal point, or to shift information from odd to even or even to odd word times.

The input register I is that portion of the main memory which is available for use at word zero with the first two digit positions T1 and T2 of the 15 digits therein being reserved for the symbol and sign, respectively. Digit times T3 through T15 are used for data with position T3 being the least significant digit of data in this or any other memory register.

The input register I is used as a temporary storage of input data from the keyboard and in list problems retains this data for repeat operations. The input register is also used as a working register for multiplication and division problems—in division, the quotient is developed in this register, and in multiplication problems, the multiplier is stored in this register. Other general uses for the input register are for storage of recalled factors from total, subtotal, and multiply functions. Data in the storage register is also transferred to the input in order to be used further. Any data in the input register at the end of a function may be used as a factor for any succeeding function since this data is not destroyed until a data input key is depressed. A nondestructive print out of input data may be accomplished by a "nonadd" function, and the input register may be cleared by a "correct" function or a "clear" function, and the first digit entered following any function key depression automatically clears the input register.

The main accumulator or M register is available from word two (W2) through word three (W3) and all addition and subtraction problems are carried out in this register with the accumulator selector control level 22 set in the M or main accumulator position. In multiplication, the main accumulator is used to develop the product, whereas for division problems, the main accumulator is used to store the first factor entered, i.e., the dividend. The remainder is then retained in the main accumulator until it is printed.

The auxiliary accumulator or A register is available from word four (W4) through word five (W5) and with the accumulator selector switch 22 set in the A or auxiliary position all addition and subtraction problems are carried out in this register. One very important use for the auxiliary register is that during second accumulator functions the auxiliary register develops a summation of the totals, products or quotients from the main register through proper setting of the second accumulator control lever 20. This is probably the primary use for the second accumulator since the addition and subtraction functions are normally carried out by the main accumulator.

The MD register is available at word six (W6) and is used in multiplication to store the first factor entered, i.e., the multiplicand; and in division, the register is used to store the second factor entered, i.e., the divisor. By use of the constant multiplicand or divisor key, the MD register will hold the data for use in succeeding problems, as will be explained more fully hereinafter.

The storage register ST is available at word seven (W7) and any data in the input register at the end of an operation may be transferred to the storage register for use at a later time through depression of the appropriate key on the keyboard. Any data already in storage in the storage register will be automatically cleared out when storing new information.

Arithmetic functions are performed in the calculator by a series of operations and suboperations or program steps. These operations are controlled by a number of external registers which are time shared for all functions, the basic timing being maintained by a counter K (FIGURE 2), which generates timing signals corresponding to TD1, TD3, TD4, T1, T2, T3, T13, T15, and W0–W7 in synchronism will control clock signals TP1 and TP2.

For depression of any selected function or command key, the calculator proceeds automatically through a fixed sequence of operations. An enter operation (ER) controls data entry into the input register. In addition to the enter operation, six operations are sufficient to perform all other calculator functions. These operations are Edit (ET), Print (PR), Add (AD), Recall (RC), Multiply (MP), and Divide (DV), and each operation can occur in various sequences depending upon the selected function determined by the depression of a key on the keyboard. Each operation is divided into a number of program steps with the program steps being repeated or bypassed depending on control conditions established as the operation proceeds. The duration of a program step is measured in terms of memory circulation time with each step requiring a minimum of one circulation time (4.8 milliseconds).

Since each parictular function designated by depression of a command key from the keyboard consists of one or more operations with each operation made up of a number of program steps in a particular sequence, it is necessary to provide a means for generating within the calculator a code representing the function key depressed and a means for determining in response to this code the operations and sequence of program steps necessary to complete the particular function. In order to provide a code representing the function key depressed a register F is provided which generates a single signal in response to the particular four bit code generated by the keyboard.

Since each function consists of a plurality of operations each made up of a number of program steps which must be carried out in a particular sequence for the given function, means must be provided within the calculator for generating and storing a code representing each of the operations to be performed in the required sequence in response to the function signal generated in the F register. This operation is carried out by the F counter, connected to the F register as indicated in FIGURE 2. The counter is provided as a means to store the code representing the operation being performed, which code will remain in the counter until all program steps required for the operation have been completed. The counter is then stepped or jammed to the code representing the next operation required for the particular function requested through the keyboard.

The F counter will generate a code for each of the six calculator operations. When the order of operations required for a particular function is the order of the binary progression of the code representing these operations and all operations are required for the function, the function code applied from the F register enables F counter to be stepped through the full list of operations. However, where the function requires less than the full number of operations or where the operations are not taken in the logical order, the F counter is jammed by the function code from the F register and the existing output signals from the F counter from a given operation to the next required operation regardless of the order.

As indicated above, the code generated by the F counter will remain in the counter until all program steps required for the given operation have been completed. Seven programs steps PC0–PC5 and PC7 are represented by signals generated in the program counter PC. (FIGURE 2). Each of these program signals serves to trigger various elements in the logic system to perform the necessary program steps for a given operation in a given function. The PC7 signal generated by the program counter PC being the last program step generated serves as an indication that all program steps have been completed; therefore, the PC7 signal is applied to the F counter to step the counter to the next operation.

In summary, it is seen that depression of a function key in the keyboard generates a four bit binary signal representing the particular function desired which signal is applied to the F register where it is converted to a single signal representing that function. The function signal from the F register is then applied to the function counter F which generates operation signals in a particular sequence according to the selected function and in response to the function signal from the F register. The program counter PC generates program step signals PC0–PC5 and PC7 which in coincidence with the function signals generated by the F counter serve to activate at the appropriate time the various portions of the logic system which carry out the arithmetic functions required by the function requested through the keyboard.

Figure 3:
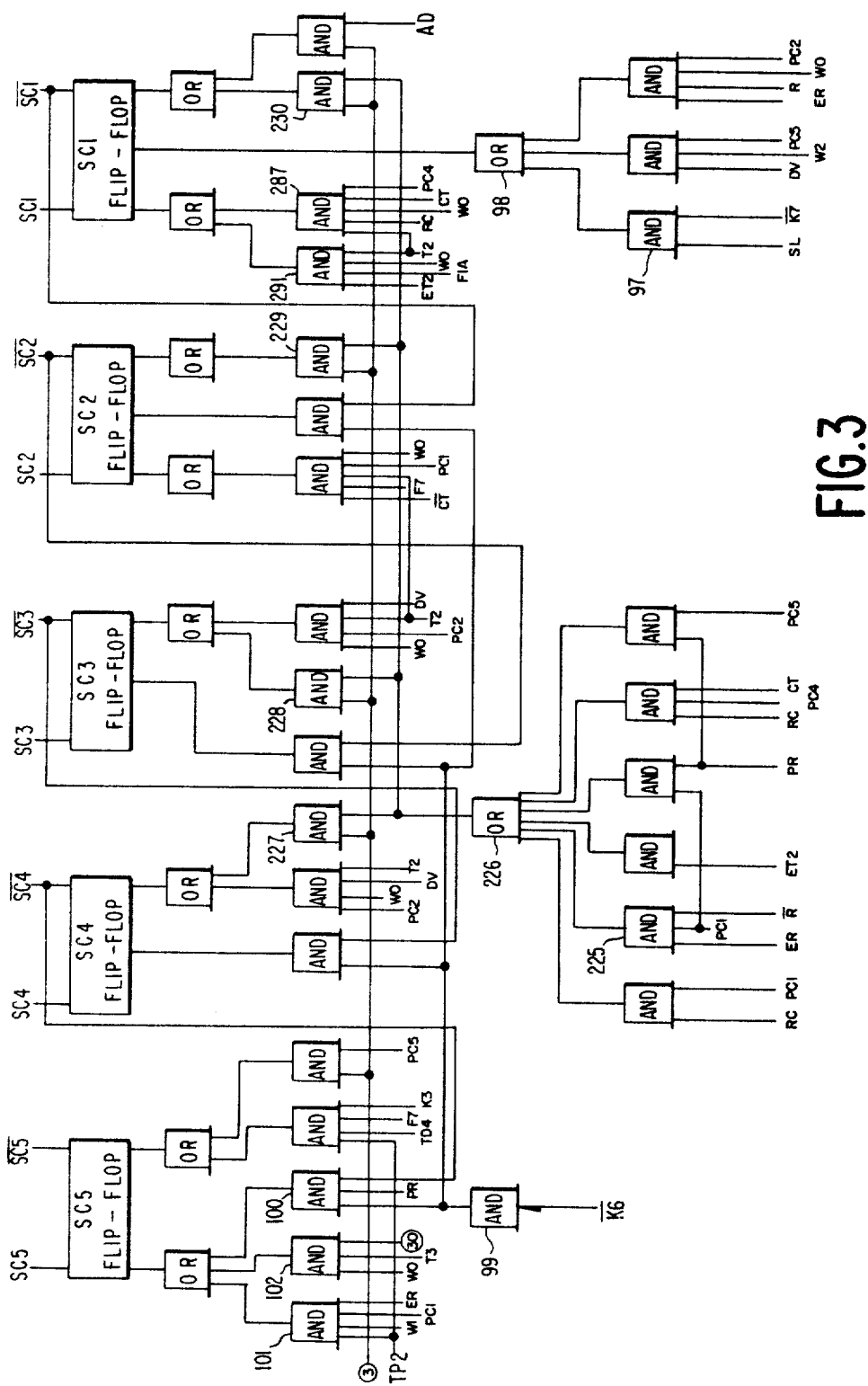
FIGURE 3 is a schematic diagram of the shift counter SC utilized in the logic system of FIGURE 2.
Figure 6:
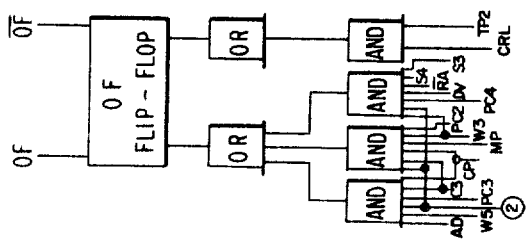
FIGURE 6 is a schematic diagram of the flip-flop OF included in the logic system of FIGURE 2.
Figure 5:
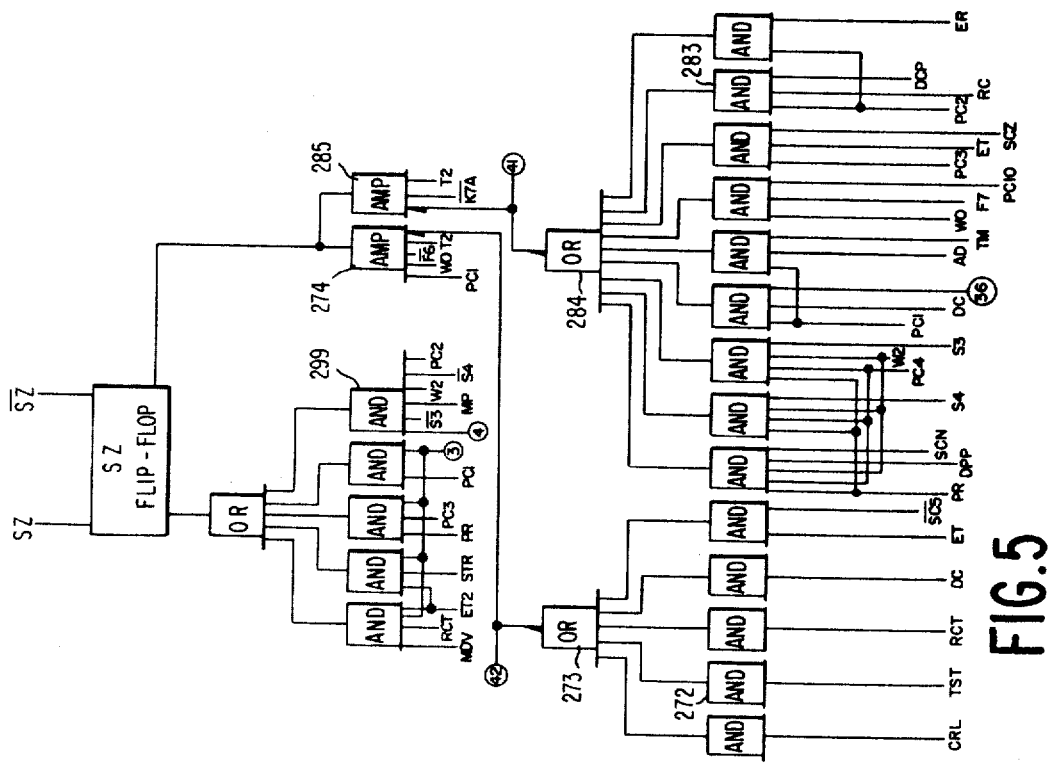
FIGURE 5 is a schematic diagram of the flip-flop SZ included according to the invention in the logic system of FIGURE 2.
Figure 4:
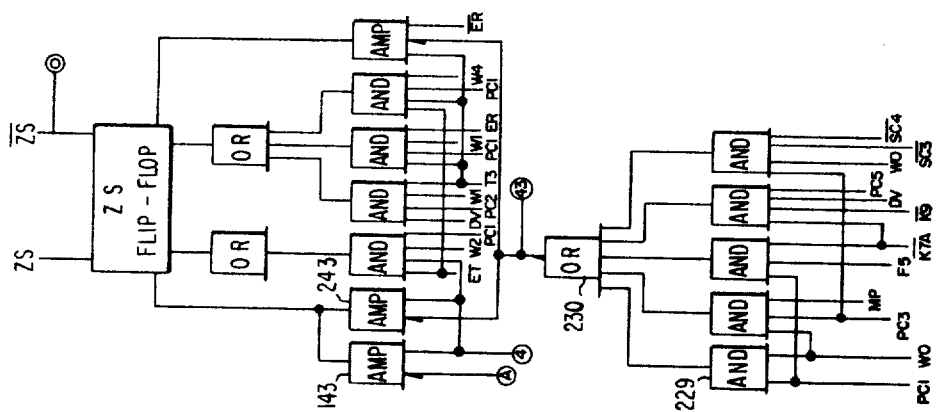
FIGURE 4 is a schematic diagram of the flip-flop ZS included according to the invention in the logic system of FIGURE 2.

Some operations including decimal alignment require the shifting of data a predetermined number of positions in the main circulating path, and so means must be provided for keeping track of the number of positions which the data is shifted. This task is carried out by shift counter SC illustrated in FIGURE 3, which consists of five flip-flops SC1–SC5. Each time a digit is shifted in a given operation, the counter is incremented by one via "or" gate 98. In most cases, less than 15 shifts are needed; therefore, the shift counter SC is set up such that a binary count of 15 will generate a signal in the output of flip-flop SC2 converted by flip-flop OF into an ending pulse EP preventing further shifting during the operation. If less than 15 shifts are required, the counter is preset prior to the start of the shifting step to a count of 15 minus the number of shift steps required by application of the operation signal from the F counter jamming the counter to the resulting count. For example, in a step requiring 12 shifts, the shift counter is preset to a binary count of 3 and data is then shifted 12 times with the shift counter being incremented once for each shift. When a count of 15 is registered in the shift counter SC, the signal SCZ is generated inhibiting additional shifting. The shift counter is always cleared or jammed to a count just prior to the start of any shift step.

In summary, the signals generated by the external counters and registers serve as timing signals which singly or in coincidence control the various operations or program steps to be carried out for each operation required for each function to performed in responce to depression of a command key on the keyboard. Each of these timing signals or program control signals is generated in time with the timing puses produced by the clock counter so that entire operation of the calculator is synchronized with regard to these timing signals. Keeping in mind the manner in which these timing signals and the program step signals and operation signals are generated and controlled, the main logic system which performs the arithmetic functions provided by the calculator will now be described.

The various operations performed by the calculator require a shifting of information left or right within the main memory, a transfer of information from the printer to the input register of the main memory, a shifting of information from the main memory to the auxiliary memory, a shifting of information from the auxiliary memory back into the main memory path, the insertion of the four bit half adder network from the main circulation path, and other steps which are performed in conjunction with the S register, illustrated in FIGURE 2.

The S register is used as a buffer for input and output data and as an input buffer, it temporarily stores the digit entered through the keyboard, which is introduced into the S register in a parallel fashion. By then inserting the four bit adder shift register in series with the main memory in the main circulating path at the appropriate time, the digit in the S register will be transferred to the least significant digit position of the input register of the main memory to the next most significant digit position. The S register is placed in series with the main memory and withdrawn from the normal circulation path by the respective setting and resetting of the MS and SM flip-flops. Automatic provision of the proper number of decimal places is also achieved in this manner. A zero is inserted into the input register via the S register repeatedly until the decimal indicator setting and the SC counter setting (representing the number of digits entered to the right of the decimal point) are equal. The S register also provides means for shifting data in the L register to effect proper decimal alignment. This will be described in more detail hereinafter.

The S register is used as an output buffer between the L register and the printer. The data to be printed appearing in the L register is shifted to the left, a digit at a time, with the S register in series with the L register so that the digit in the most significant digit position of the L register will be temporarily stored in the S register for printing. The S register is placed in series with the L register by setting the SL flip-flop.

The next main potrion of the logic system is the four bit adder network 62, illustrated in FIGURE 2. As previously described the adder network is part of the normal circulation path of the main memory. The data passes through the adder bit by bit from flip-flops A1 to AS to D1 to A2 and is written back into the memory by signal WM. During the normal memory circulation, the remainder of the adder flip-flops seen in FIGURE 2, i.e., B1, C1, C3, B2 and C2 are reset.

Certain operations performed by the calculator require that the data in a portion of the memory be complemented. This is done by setting flip-flop CM at the appropriate time. With CM set, the normal memory path through flip-flop A1 is blocked and an alternate path which applies $\overline{M}$ (memory complement) to set flip-flop A1 and applies M to reset the flip-flop in coincidence with the signal CM. In this way, a binary "1" from the memory resets flip-flop A1 and is written back into the memory as a 0.

As indicated above, new information is entered into the memory by setting flip-flop SM placing the S register within the normal circulation path with the output of the S register gated into the flip-flop A1 of the adder network. Data may also be transferred directly from the L register to the main memory by setting flip-flop LM. Setting flip-flop LM blocks the normal circulation path and allows the contents of the L register to enter the memory through the flip-flop A1. It is therefore seen that the normal circulation path of the memory may be broken at adder input flip-flop A1 to allow the data in the memory to be complemented, to enter data from the S register or to transfer data from the L register into the normal circulation path.

Addition is accomplished by the calculator by placing one factor in the L register and the other factor in the main or auxiliary accumulator. At the appropriate time, the data in the L register is gated into the adder flip-flop B1 in coincidence with the control signals from the control flip-flop AF and addition is carried out in the well known manner.

Subtraction is accomplished by the calculator through addition of the tens complement of the subtrahend to the minuend. The subtrahend is placed in the L register and the nines complement is obtained by setting flip-flop CP. The signal CP generated by flip-flop CP when applied to input adder flip-flop B1 allows data from the L register to enter B1 in complemented form by blocking the normal circulation path.

Since the tens complement is obtained by adding a one to the nines complement, flip-flop CP also sets initial carry flip-flop IC. The signal IC is generated by the flip-flop is then applied to flip-flop C1 jamming a one or initial carry into the flip-flop so that a 1 is added to the first bit of digit one producing the tens complement. Normal addition is then carried out to produce the remainder.

Multiplication is carried out through successive addition of the multiplicand placed in the MD register of the main memory with shift left being controlled by the multiplier into the input register of the main memory. The division process is carried out through successive subtractions in the well-known manner.

Shift control for information in the main memory is carried out by flip-flops MS and SM which control the flow of data from the main memory to the S register and from the S register to the main memory path, respectively, and by flip-flop RSH which allows data to bypass the four bit adder network during multiplication therefore placing the data back into the memory a digit early. The data is thereby shifted within the main memory system one digit to the right as required during the multiplication operation.

The memory control for the calculator consists of the three flip-flops ML, LM, and SL which control the flow of data between the main memory and the S and L registers in a manner already described above. The sign control for the calculator consists of flip-flops CP, P, CG and R. As indicated above, flip-flops CP transfers the complement of the L register into the adder flip-flop B1. The flip-flop P provides temporary storage for the sign of the selected accumulator which is extracted from the accumulator and placed into the S register, which in turn sets the P flip-flop for a positive sign and resets the flip-flop for a negative sign.

The flip-flop R is provided to indicate a decimal key depression during the enter operation activating the SC counter to count subsequently added digits and in multiplication to initiate a recomplement step. The R flip-flop is also utilized in conjunction with the CT flip-flop to indicate the particular ET or PR operation during the multiply and divide sequences since there are two ET and PR operations in the multiply sequence and three in the divide sequence.

The flip-flops ZS and SZ are zero control flip-flops. The flip-flop ZS is connected to the S register and inserts zeroes in this register, when set, for subsequent shifting into the main memory or L register for decimal alignment. The flip-flop SZ serves to coordinate control between the decimal point indicator and the SC counter to end a shifting step and suppress insignificant zeroes during a print operation.

Keyboard functions which require similar control are arranged into groups that are implemented by the same sequence of operations. Since the same basic operations are used for all functions, the specific work of an operation depends upon the sequence in which it occurs.

Figure 7:
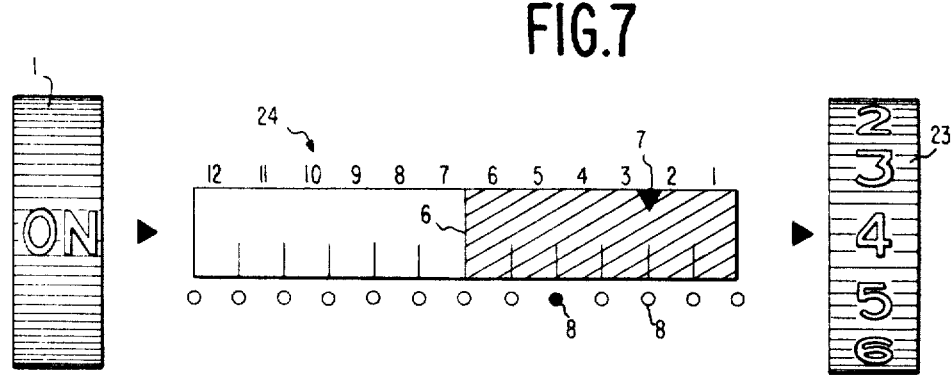
FIGURE 7 is a detail view of the decimal point selector dial and column indicator on the keyboard of the calculator illustrated in FIGURE 1.

In accordance with the instant invention alignment of data around the decimal point is automatic within the calculator once the maximum number of decimal positions required is set on the decimal point selector dial 23, positioned on the keyboard 14 adjacent to the column indicator 24 as shown in detail in FIGURE 7. The number set on decimal point selector dial 23 indicates the maximum number of digits to the right of the decimal point which will be required to introduce all of the data required for a given function. Therefore, the number of the decimal preset dial should be set to equal the largest number of digits to the right of the decimal point for any of the numbers in the problem or series of problems to be handled.

Figure 8:
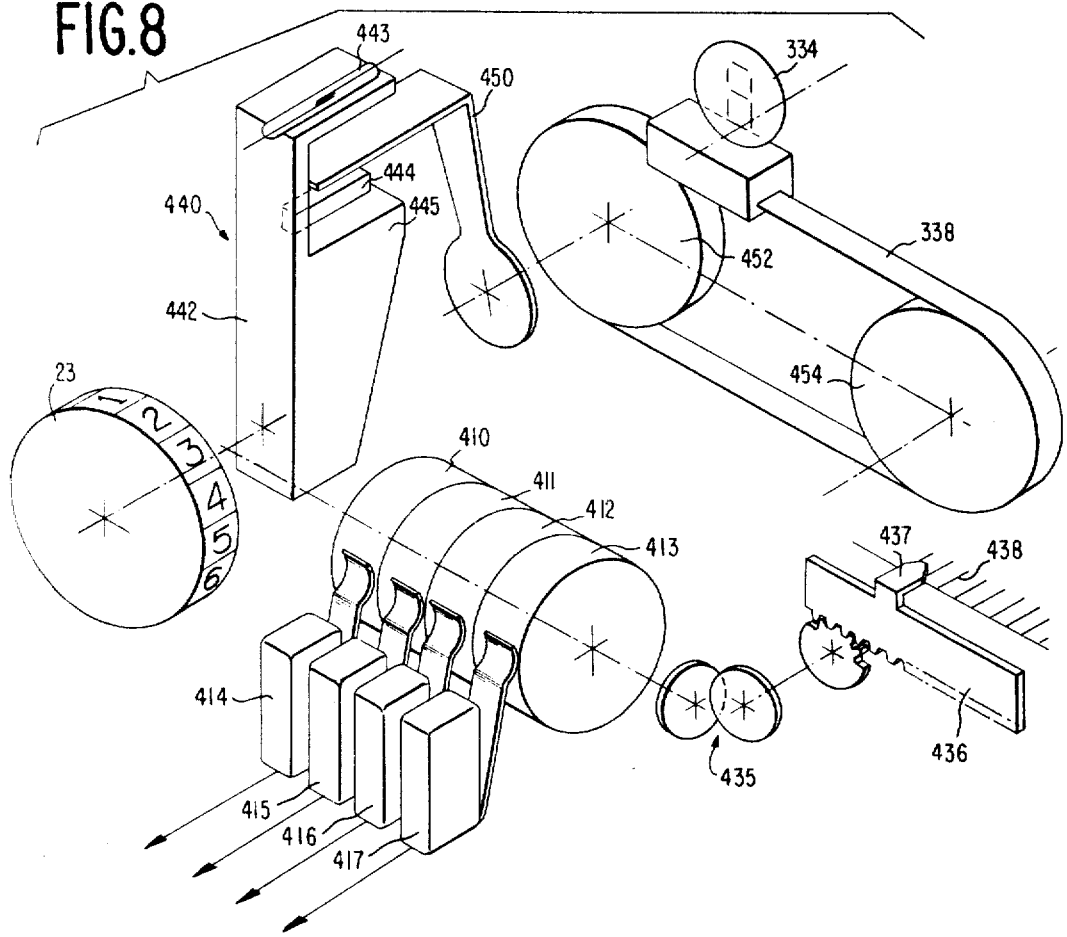
FIGURE 8 is a simplified representation in perspective of the decimal print control system in accordance with the instant invention.

As schematically illustrated in FIGURE 8, the decimal preset dial 23 is mechanically coupled to and actuates a plurality of cams 410–413, which are so designed and oriented with respect to one another as to generate for each selected position of the preset dial 23 a four bit binary code and four bit complementary code representative of the particular values selected on the dial 23. The cams actuate respective microswitches 414–417 each of which provides a pair of outputs representing the on or off conditions of the switch such that the signals derived from the four microswitches represent the binary code of the decimal number selected.

Figure 9:
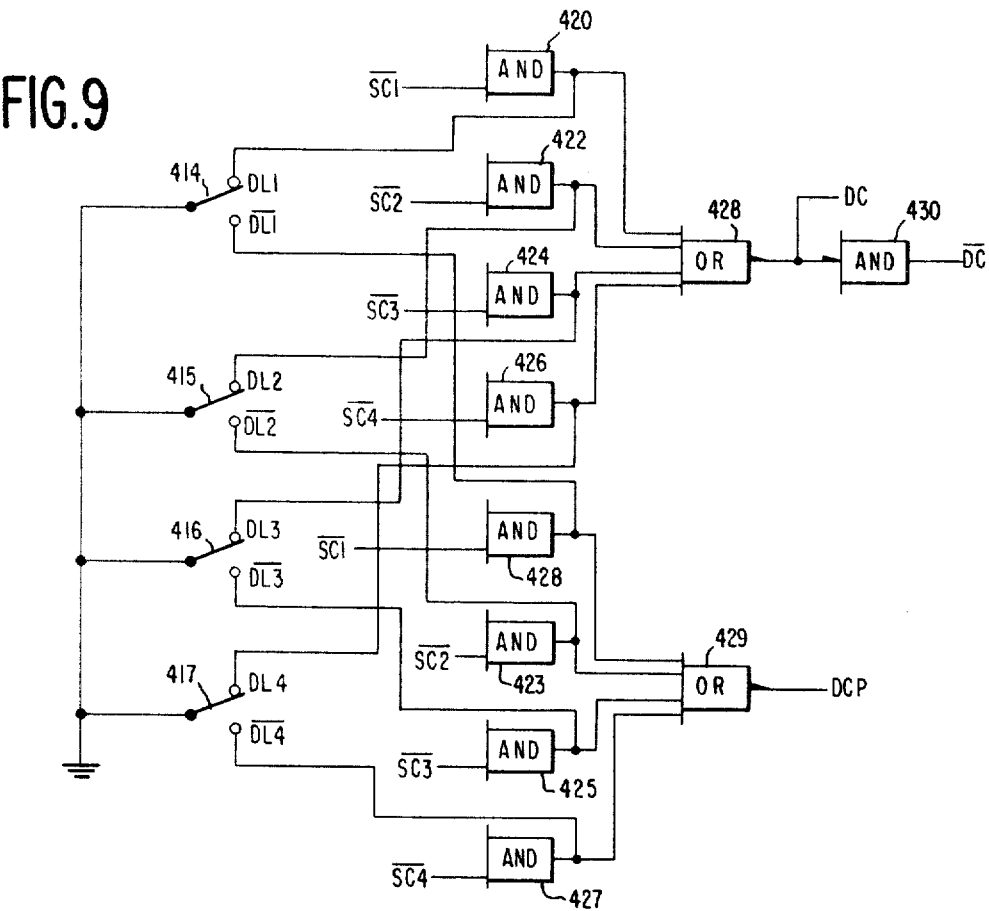
FIGURE 9 is a schematic diagram of the decimal point control system operated in conjunction with the system of FIGURE 8.

Switches 414–417 are included in a decimal point indicator circuit illustrated in FIG. 9. One terminal of each of the switches 414–417 is connected respectively to a series of four "and" gates 42–, 422, 424 and 426 to which are also applied the signals $\overline{SC1}$–$\overline{SC4}$ from the shift counter SC. The output of each of the "and" gates 422–420–424 and 426 is applied to "or" gate 428 which will generate a signal DC only when the binary code representation generated by the microswitches is identical to the binary code generated by the shift counter indicating that the decimal point setting corresponds to the number of digits which has been shifted into the memory to the right of the decimal point.

In a like manner, the other terminal of each of the microswitches 414–417 is connected to a series of "and" gates 421, 423, 424 and 427 to which are also applied the signals $\overline{SC1}$–$\overline{SC4}$ from the shift counter SC. When the complementary decimal designation from the microswitches is identical to the binary code generated by the shift counter SC the "or" gate 429 will produce an output DCP.

The manner in which automatic decimal point alignment is carried out by the calculator under control of the output from the decimal point indicator circuit, illustrated in FIG. 9, may be understood most readily from a description of the operations which are carried out during a simple addition.

For each depression of any numeric key, a digit corresponding to the key depressed will be placed in the input register of the main memory by means of the single two step operation called ER. The input register is cleared when the first digit of a new number is indexed and the number of digits entered following the decimal key depression is counted for use in the subsequent EDIT operation.

The enter operation requires the two program steps PC1 and PC2. The step PC1 clears the shift counter SC, if the decimal key has not been depressed setting flip-flop R, through coincident applications of signals ER, PC1 and $\overline{R}$ through input "and" gate 225, "or" gate 226, and through respective input "and" gates 227–230 in coincidence with W0 and T1 thereby jamming the shift counter to "0." If flip-flop R is set at the time of the enter operation indicating that the decimal key has been depressed either during this operation or during a preceding enter operation, the step of clearing the shift counter is prevented so that the decimal digit count will not be destroyed.

At the same time, W0 and PC1 are applied through input "and" gate 229 and "or" gate 230 to flip-flop ZS placing zeroes in the S register, which are subsequently shifted to the main memory path thereby clearing the input register for the first digit only. The digit from the keyboard is then transferred to the S register and the program counter is advanced to PC2, which through setting of flip-flops MS and SM inserts the data into the input register. The shift counter is then incremented if the decimal key has been depressed and the program counter is set to 0. The indexed digit from the keyboard has therefore been entered into the calculator memory in the input register and the machine is ready to accept the next command.

The enter operation is repeated for each depression of a data key until a command key is depressed or the number of digits entered to the right of the decimal point, i.e., after the decimal key has been depressed, as recorded by the shift counter SC, equals the number set on the decimal point indicator dial 23. Once the maximum number of digits to the right of the decimal point has been entered into the machine, no further entries of data will be accepted by the calculator.

After data is entered into the input register and the add key is depressed indicating an addition function, the calculator proceeds automatically through the ET, PR, AD and RC operations respectively transferring data to the L register and arranging it for printing, printing the data in the L register, adding the data in the L register to the main accumulator of the main memory and ending the add function.

During the ET operation, prior to transferring the data from the input register to the L register, zeroes are entered to the right of the decimal point, if required, to align the data with the machine decimal setting as indicated by the decimal indicator dial 23. Thus, it is unnecessary to index zeroes after the last nonzero decimal digit of a number since this is carried out automatically by the calculator.

In providing automatic decimal alignment during the ET operation an excess-3 zero is jammed into the S register by setting the flip-flop ZS. At the same time the flip-flop SZ is set by timing signals PC1, W0 and T1 via input "and" gate 224 of the flip-flop SZ. As long as the flip-flop SZ remains set, the control flip-flops MS and SM will be actuated alternately with the setting of flip-flop SZ so that zeroes will be inserted into the least significant digit position of the data in the input register thereby adding zeroes to the right of the decimal point.

Zeroes will be inserted into the main memory through this repeated insertion of the S register into the main circulation path until the code generated by the shift counter representing the number of digits entered after the depression of the decimal key equals the code generated by the DC "and" gate circuit, illustrated in FIGURE 9, which is responsive to the decimal point indicator setting dial of the dial 23. Each time a zero is shifted into the input register through setting of the flip-flop ZS, MS and SM, the flip-flop SL will also be set incrementing the shift counter so that an accurate count of the number of digits entered into the input register after depression of the decimal key can be maintained.

The program step PC2 of the ET operation then shifts the data from the input register into the L register in preparation for printing. During the print operation, decimal point alignment is provided for data shifted from the accumulators or other registers in the same manner as described above with regard to shifting of data in the input register. After printing of the data in the L register, this data is added to the main accumulator and the operation is ended.

During the add operation, data alignment is once again necessary unless the previous operation was a total, subtotal or product since the first application of data from the input register to an accumulator requires that the data to the right of the decimal point include twice the number of digits as required by the decimal point indicator setting. All data in the accumulators is provided with this double decimal place factor so that during arithmetic functions such as multiplication, a sufficient number of decimal places will be available. This decimal point alignment during the add operation is essentially identical to that carried out during the enter operation with zeroes being inserted into the S register from the ZS flip-flop and then into the L register until the flip-flop SZ is reset by generation of the signal DC.

Depression of a total or subtotal key on the keyboard causes the number accumulated in the main or auxiliary accumulator to print out. This is accomplished by transferring the data in the main accumulator to the L register, printing the data from the L register, and then shifting this data back into the main accumulator and also into the input register so that subsequent data can be added to this total. However, since the accumulator contents are aligned to twice the decimal point indicator setting, this data must be shifted right in the L register a number of positions equivalent to the decimal point indicator setting before transfer to the input register. Since only left shifts can be performed in the L register, decimal alignment must be accomplished by end around shifting. The required number of left shifts is equal to 15 minus the decimal position indicator setting plus 14. This shifting is carried out during the recall operation of total or subtotal functions with PC2 performing the 15 minus the DPI setting and PC4 performing the remaining 14 shifts.

In performing the shifts 15 minus the decimal point indicator setting during the program step PC2 the number of shifts are controlled by generation of the signal DCP in the "and" gate circuit illustrated in FIG. 9. Since this signal is derived through generation of the complement of the signal DC it will automatically represent the proper number of shifts required. Upon generation of the signal DCP, the flip-flop SZ will be reset via "and" gate input 283 jamming the program counter to PC4 which continues the alignment step by providing 14 left shifts to the data in the L register. The combination of steps PC2 and PC4 provide a sufficient number of left shifts to convert the decimal alignment to that which can be accommodated within the input register.

As indicated above, decimal alignment is provided automatically within the calculator once the decimal point indicator dial 23 is set to the proper number of decimal places required for each number inserted into the machine. The machine will then continue to provide automatic decimal point alignment for each function carried out until it is necessary to introduce a number into the machine which has more decimal places than the setting of dial 23 permits. At that point, the decimal indication must be changed or the least significant decimal digit will be lost.

The setting of the dial 23 on the keyboard also automatically provides a synchronizing print signal for decimal point printing. The printer utilized with the disclosed calculator is the type of apparatus which effects printing of data electrically on electrosensitive record material. These printing arrangements provide a plurality of styli in a patterned arrangement capable of producing characters through selective time energization of the styli as the printer is swept across the face of the record material. The styli are physically separated and electrically isolated from each other in a pattern most conducive to the generation of the desired characters.

In such systems the styli rest directly upon the record material and current is caused to pass from the selected styli through the record material to a ground plate located at the opposite side of the record material, or from one styli through the paper to another styli. The current in passing through the record material causes distinct marks or dots which can be combined through proper timed energization of the styli to form the data to be printed.

Figure 10:
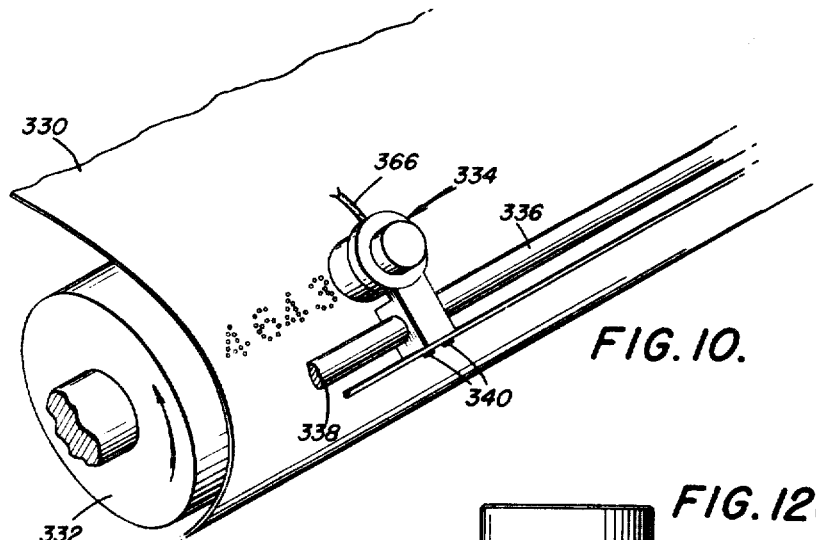
FIGURE 10 is a simplified representation in perspective of the printing arrangement utilized in the calculator of FIGURE 1.

Referring now to FIGURE 10, printing is accomplished on a tape or strip 330 of chemically treated paper of the electrosensitive type. A tape conveyor of any conventional design is represented schematically by a conveyor roller 332; it being understood that the tape conveyor is adapted to move tape 330 line by line to place successive lines of the tape into printing position; the direction of tape movement being indicated by the directional arrow shown on roller 332.

A stylus or printing head 334 is slidably mounted on a guide rod 336 for movement transversely of tape 330 at the printing position. Printing head 34 may be driven by any suitable means from the left edge of tape 330, the initial printing position, to the right edge of the tape during the printing cycle, and then back to the left tape edge, in preparation for printing the next line. Such driven movement is preferably effected at a substantially constant speed by printing head conveying mechanism (not shown), which transmits driven motion to printing head 334 by means of a timing belt 338 attached by fasteners 340 to a printing head 334 (FIGURE 10). Incident to printing the head 334 being returned to its initial printing position at the end of a printing cycle, roller 332 of the tape conveyor (not shown) moves tape 330 in the direction of the directional arrow to place the next printing line of tape 330 into printing position. Actuation of roller 332 is effected by the above-mentioned printing head conveying mechanism.

Figure 12A:
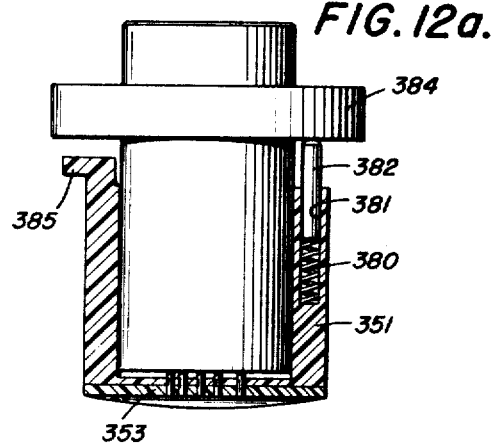
FIGURE 12a is a detailed side view of the print head of FIGURE 11.
Figure 12:
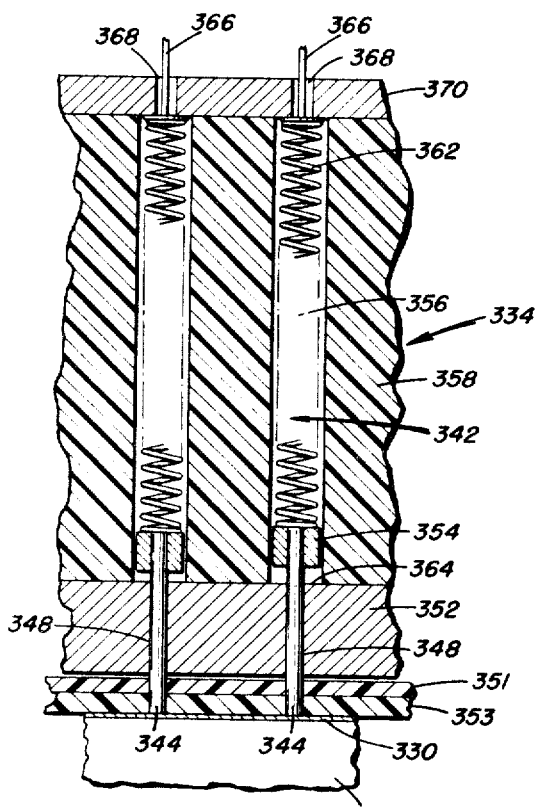
FIGURE 12 is a partial section through the print head of FIGURE 11.

Printing head 334 is formed of an electrically non-conducive material and is provided in the illustrated embodiment with individual styli assemblies 342 (FIGURES 11 and 12), each having a stylus or electrode in the form of a rod-like pin 334; the pins being designated P1 through P14 to differentiate the pins from one another. In addition, a pair of pins P15 and P16 are provided for inserting the decimal point designation in the proper position between numerals along the line of print. Styli pins 344 protrude from the bottom of printing head 334 and are arranged into a matrix having the configuration of a digit "8" slightly slanted to the left, as seen in the bottom view of FIGURE 8 of the printing head 334.

The pin 344 of each styli assembly 342 is formed of conducive material, preferably of tungsten and is slidably disposed in an associated pin hole or channel 348 defined in a bottom portion 352 of printing head 334. Each pin 344 is provided with a sleeve 354 of conducive material, such as stainless steel, which sleeve is "press fit" onto the upper end of the pin. Sleeve 354 is slidably confined in a channel 356 aligned with channel 348 and defined in an intermediate portion 358 of printing head 334 to permit up and down movement of pin 334 and sleeve 354 in channel 356. A biasing spring 362 presses against sleeve 354 of its associated pin 344, biasing the pin downward to maintain the free or lower end of the pin in constant contact with the upper surface of tape 330. Downward movement of pin 344 is limited by its sleeve 354 abutting a shoulder 364 formed by printing head portion 352 where channel 348 joins channel 356.

An electrical connecting lead 366 is provided for each pin 344 and extends through a hole 368 defined in a portion 370 of printing head 334. Each lead 366 enters the channel 356 of its respective pin 344 and is connected electrically to the uppermost portion of the spring 362 in such channel. The leads 366 serve to connect their respective pins 344 (P1–P16) to the pin energizing circuits.

It may be noted that with the described mounting arrangement of each styli assembly 342, each styli pin 344 is individually spring biased to continually bear upon and frictionally engage the top surface of tape 330, as printing head 334 is driven transversely of the tape. Such individual spring biasing automatically compensates for unevenness of the tape surface and for variations in the wear rates of the individual styli pins 344. However, this direct contact of the styli pins with the paper surface has a tendency, should the styli pins be exposed from the print head, to pickup fibers from the paper, dust particles and other foreign matter which shortly will cause a fouling of the print head considerably reducing, if not altogether disrupting, the print capability of the arrangement.

The fouling problem mentioned above is solved by the inclusion of a boot 350 over the print head, which boot consists of a phenolic cap 351 and a Teflon gasket 353. The boot 350 is provided with a plurality of holes, each in substantial alignment with one of the styli pins of the printing head so that the individually spring biased styli pins may protrude through the boot and contact the recording surface 330. The boot 350 is spring loaded with respect to the print head by springs 380 recessed in channels or grooves 381 in the cap 351. The springs 380 act upon pins 382 in contact with the collar 384 surrounding the print head. The bias provided by springs 380 forces the Teflon gasket 353 against the surface of the tape 330 so that the styli pins 344 are completely isolated except for the cross-sectional ends which contact the surface of the tape. Since the Teflon gasket is in pressure contact with the tape 330 when the print head assembly is in the print position, the end of the cap and Teflon gasket have a radius comparable to that of the roller 332 so as to insure good contact between the gasket and the paper over the full gasket area. The holes in the cap 350 through which the print pins pass have a dimension only slightly larger than the pins themselves; however, due to the natural lubrication provided by the Teflon material, the pins may very easily slide in and out of the print head in response to pressure by the springs 362 insuring good contact between the pins 344 and the surface of tape 330.

When the print head is released to the print position, the outer surface 355 of bottom portion 352 is stopped before engaging inside surface 355 of the cap 351 by a stop 385 on the cap so that a gap 357 is provided therebetween. The individually biased styli pins 344 protrude slidably through the boot 350 to engage the record surface 330. The spring bias on the boot relative to the print head places the front surface of the Teflon gasket 353 firmly but resiliently against the record surface to be printed upon. Thus, the styli pins 344 are completely surrounded by the boot 350 so that only the cross-sectional end surfaces of the pins are exposed and these firmly contact the surface of tape 330. In this position, the record sheet engaging ends of the pins are substantially in the same plane as the outer surface of the Teflon gasket 353.

Figure 11:
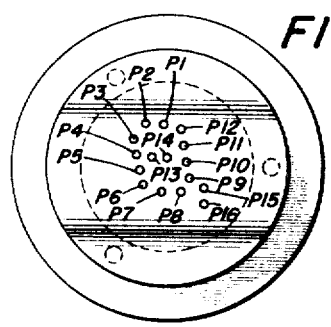
FIGURE 11 is a front plan view of the print head utilized in the printing arrangement of FIGURE 10.

By selectively electrically pulsing certain combinations of pins 344 of the styli matrix of FIG. 11, the configurations of numerals 0 through 9 and some special symbols may be printed upon tape 330 (FIG. 10), as printing head 334 is moved transversely thereto. Such marking is effected in the preferred embodiment by causing a succession of current pulses to flow from one pin 344 (FIG. 12) along the chemically coated surface of conductive tape 330 to a second pin 344 which is associated with and spaced from the first pin. For example, with the pair of pins P1, P2, shown in FIG. 12, a pulse of current may be caused to flow successively from pin P1 along tape 330 to pin P2. Such current flow causes chemically treated tape 330 to darken or change color at the two points where pins P1 and P2 engage the tape surface to provide legible distinct marks thereat which due to successive pulsation thereof may take the form of elongated dots or lines. The electrical pulsing of the pins is substantially instantaneous, such that movement of printing head 334 relative to tape 330 is effectively stopped during printing. This prevents blurring, notwithstanding the relative motion between pins 344 and tape 330 during the printing. The fourteen styli pins 344 (P1–P14, FIG. 11) comprising the digit "8" styli matrix, are electrically connected to the pin energizing circuits in pairs.

The pin styli 344 are therefore divided into pin pairs and an electrical styli energizing circuit is provided for each pair of pins (FIG. 13). Thus, eight pin energizing circuits, or "driving" circuits, 371–378 are utilized for energizing the sixteen pins. The digits 0 and 1 through 9, plus certain symbols, such as the letter "C" and the decimal point may be printed by causing the driving circuits to successively energize selective pin pair combinations in accordance with a particular time sequence.

The driving circuits utilize means in the form of a decoding matrix 383 for detecting the input of certain "pin selection" signals derived from an input processor 379. The decoding matrix translates the selection signals and conditions the driving circuit to effect subsequent energization of its associated pin pair or to prevent such energization, as the signals dictate. The detecting means also automatically and continually responds to changes in pin selection as denoted by the selection signals.

A "print" signal causes energization of print initiating means, which generate initiating or gating signals which are applied simultaneously to all driving circuits via the decoding matrix 383. This causes the driving circuits of the selected pin pair combination to be simultaneously energized to form the desired character on the record medium, while those of the unselected pin pairs are maintained unenergized in accordance with the preconditioned state of the driving circuits. The print initiating signals are in the form of electrical pulses.

During printing, the printing head 334 is moved at a substantially constant speed transversely of the record tape 330. Selection of the pin pairs to be energized and pulsing of their respective driving circuits are synchronized with transverse movement of the print head such that desired characters are printed sequentially on a print line. In this way, energization of selected pin pairs in response to the common print initiating pulses will be sufficiently instantaneous so as to appear to "stop" relative motion between the print head and record material, producing distinct printed characters on the record material, notwithstanding such relative motion.

In accordance with the instant invention, a synchronizing signal insuring proper energization of the print head for printing a decimal point in accordance with the decimal point indicator dial 23 is performed by the mechanism illustrated in FIG. 8. In addition to operating the cams 410–413 the decimal point selector dial 23 is also connected to a rotatable assembly 440 consisting of a support member 442 for a reed switch 443 and a permanent magnet 444 secured on either opposing face of a slot 445 in the support member 442 such that the reed switch 443 and the permanent magnet 444 are supported in closely spaced relationship. The assembly 440 is rotatable by means of the dial 23 through 360° and is capable of assuming 13 positions corresponding to the 13 settings of the dial 23.

When exposed to the field of the permanent magnet 444, the normally open contacts of the reed switch 443 will be forced into the closed position. The reed switch is connected to a transistor driver circuit (not shown) having one end thereof connected to ground and the other end connected to the base of the transistor in the driver circuit such that an open reed switch is necessary to saturate the transistor activating the transistor driver circuit. Such circuits are very well known in the art and may be provided in any form, or other circuits or arrangements which will accomplish the same switching operation may be utilized without departing from the spirit and scope of the invention. However, as long as the reed switch is exposed to the magnetic field of the permanent magnet 444, a closed switch condition will prevail, and in order to effect a printing of the decimal point, a print signal must be obtained from the logic system, and this must coincide with the opening of the reed switch 444. Under any other conditions the decimal point driver circuit will not be activated.

In order to provide for opening of the reed switch 443 at the proper instant to effect printing of the decimal point, a rotating shutter 450 made of a magnetic material having a high permeability and a low residual inductance is positioned to pass during its normal rotation between the reed switch 443 and the permanent magnet 444. The rotating shutter 450 is connected to one drive wheel 452 of a pair of drive wheels 452 and 454 in the constant speed print head drive mechanism which provides a reciprocal motion of the print head 334 during printing. As indicated above, the print head 334 reciprocates across the record paper and prints as it moves. The print head drive mechanism is arranged such that when the print head reaches the extreme right hand position, the drive wheels 452 and 454 are deactivated automatically and the print head is reciprocated back to the starting position. The wheels 452 and 454 are dimensioned such that one complete rotation thereof will move the print head from the extreme left hand position to the extreme right hand position; therefore, with the rotating shutter 450 connected to a common shaft with the drive wheel 452, movement of the print head from its start position to the end of a print line will effect one complete rotation of the shutter 450.

It can therefore be seen that each position along the path of rotation of the shutter 450 represents a comparable position of the print head in its travel from its extreme left hand position to its extreme right hand position. By then properly placing the arrangement 440 at a position along the path of rotation of shutter 450 comparable to the point at which the decimal point should be printed along the path of movement of the print head 334, the reed switch 443 will be isolated from the effect of the magnetic field of permanent magnet 444 by the rotating shutter 450 at the precise time when printing of the decimal point is required. The signal generated at this time by the opening of the switch 443 in coincidence with the print signal generated by the logic system will insure accurate printing of the decimal point.

Figure 8A:
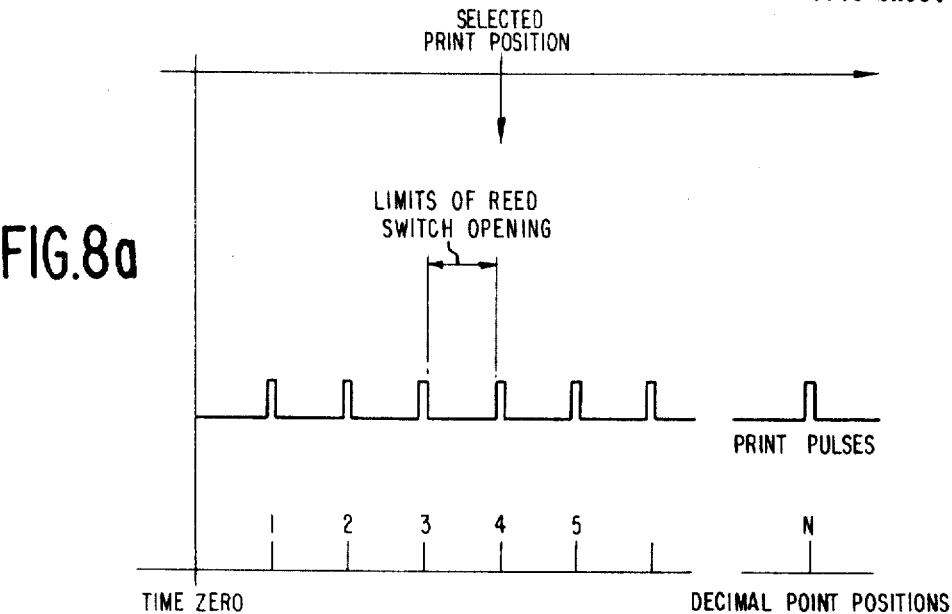
FIGURE 8a is a diagram illustrating operation of the decimal point control system of FIGURE 8.

Since the positional accuracy of the print head depends to a large extent upon the accuracy of the constant drive provided by the wheels 452 and 454 in the driving mechanism associated therewith (not shown), which accuracy is subject to considerable fluctuation in view of the many components involved, the mechanism in accordance with the instant invention, as illustrated in FIG. 8, provides a means for detecting the position of the print head from the print head mechanism itself rather than from an outside timing source so that any inaccuracies in the mechanical system are effectively eliminated thereby considerably improving the positional accuracy of the printed decimal point. FIGURE 8a shows a timing chart for the decimal point print out at the fourth position with the opening of the reed switch being indicated by the arrow at the upper portion of the figure.

There are two indications of the decimal point position selected on the keyboard of the calculator. The first is the number exposed on the decimal point indicator dial 23 and the second is the decimal point position indicator 8, shown in FIG. 7, positioned below and read in conjunction with the column indicator 24. The decimal point indicator 8 is associated with the dial 23 through the cams 410–413 and this indicator is positioned at the same time the cams are positioned through appropriate gearing 435 or any other type of arrangement which will provide a linear progression with rotation of the dial 23.

In the illustrated embodiment of FIG. 8, the gear arrangement 435 serves to reciprocate a rack 436 to which is attached a pointer 437 moving linearly over a dial 438. The apertures 8 provided in the keyboard 14 may provide the means for sighting the dial 437, or an illuminating means or other indicating means may be provided beneath the apertures 8 for sighting or otherwise indicating the particular decimal point position selected.

In addition to the decimal point indicator, a decimal point pointer is provided in conjunction with the column indicator mechanism 24, which decimal point pointer is activated only after depression of the decimal point key on the keyboard and is indexed one position for each digit which is introduced into the machine at the depression of the decimal key. In this way, the number of digits to the right of the decimal point entered through the keyboard as compared to the number possible because of the decimal point selector dial setting is visibly apparent. The column indicator dial consists of a sliding mask 6 which indicates in the well known manner the total number of digits which have been entered into the machine.

We claim:

1. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head.

2. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path.

3. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto.

4. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position.

5. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position, said electrical output generated by said detector means serving as a synchronizing signal for printing of said decimal point.

6. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position, said adjusting means including dial means calibrating the position of said detector means to the number of the decimal position at which printing of the decimal point is to occur.

7. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, said magnetic switch and magnet combination comprising a reed switch having normally open contacts, and a magnet spaced from said reed switch, the contacts of said reed switch being closed by effect of the field of said magnet.

8. A decimal point control system for electronic calculators providing decimal point print synchronization comprising:

printer means for printing electrically on electrosensitive record material including a print head and means for driving said print head across said record material in one continuous movement in a reciprocating manner, detector means for generating an electrical signal in response to detection of said printer means in a preselected position, and adjusting means for adjusting said detector means to select the position of said printer means at which said electrical signal is to be generated, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position, said electrical output generated by said detector means serving as a synchronizing signal for printing of said decimal point, said adjusting means including dial means calibrating the position of said detector means to the number of the decimal position at which printing of the decimal point is to occur, said magnetic switch and magnet combination comprising a reed switch having normal open contacts, and a magnet spaced from said reed switch, the contacts of said reed switch being closed by effect of the field of said magnet.

9. In an electronic calculator for performing arithmetic functions having keyboard means for entering data and commands into said calculator, a decimal point control system providing automatic decimal point alignment within the calculator comprising:

dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation.

10. In an electronic calculator for performing arithmetic functions having keyboard means for entering data and commands into said calculator, a decimal point control system providing automatic decimal point alignment within the calculator comprising:

dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation, said means responsive to said dial means for generating said electrical binary representation including a plurality of cams each corresponding to a bit of said binary representation and a switch associated with each cam and actuated thereby to provide alternative binary indications.

11. In an electronic calculator for performing arithmetic functions having keyboard means for entering data and commands into said calculator, a decimal point control system providing automatic decimal point alignment within the calculator comprising:

dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation, said means responsive to said dial means for generating said electrical binary representation including a plurality of cams each corresponding to a bit of said binary representation and a switch associated with each cam and actuated thereby to provide alternative binary indications, said cams being fixed in position with respect to one another so as to provide successively increasing binary representations upon rotation thereof.

12. In an electronic calculator for performing arithmetic functions having keyboard means for entering data and commands into said calculator, a decimal point control system providing automatic decimal point alignment within the calculator comprising:

dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation, decimal key means in said keyboard for indicating initial introduction of decimal data into said register means actuating said counter means to begin counting of subsequent data shifts in said register means.

13. In an electronic calculator for performing arithmetic functions having keyboard means for entering data and commands into said calculator,
a decimal point control system providing automatic decimal point alignment within the calculator comprising:
dial means for preselecting the number of decimal places desired for data entered into said calculator,
means responsive to said dial means for generating an electrical binary representation of the setting of said dial means,
register means in said calculator for storing input data,
means for shifting data into said register means in a serial manner through said keyboard means,
counter means actuated in response to introduction of decimal data into said register means for counting each decimal digit entered through said keyboard means, and
means responsive to a command from said keyboard means for automatically entering zeros in said register means until the setting of said counter means corresponds to said electrical binary representation,
said means responsive to said dial means for generating said electrical binary representation including a plurality of cams each corresponding to a bit of said binary representation and a switch associated with each cam and actuated thereby to provide alternative binary indications,
said cams being fixed in position with respect to one another so as to provide successively increasing binary representations upon rotation thereof,
decimal key means in said keyboard for indicating initial introduction of decimal data into said register means actuating said counter means to begin counting of subsequent data shifts in said register means.

14. In an electronic calculator for performing arithmetic functions having keyboard means for entering data and commands into said calculator,
a decimal point control system providing decimal point print synchronization and automatic decimal point alignment within the calculator comprising:
printer means for printing electrically on electrosensitive record material including a print head and means for driving said print head across said record material in one continuous movement in a reciprocating manner,
detector means for generating an electrical signal in response to detection of said printer means in a preselected position,
adjusting means for adjusting said detector means to select the position of said printer means at which said electrical signal is to be generated, including dial means for preselecting the number of decimal places desired for data entered into said calculator,
means responsive to said dial means for generating an electrical binary representation of the setting of said dial means,
register means in said calculator for storing input data,
means for shifting data into said register means in a serial manner through said keyboard means,
counter means actuated in response to introduction of decimal data into said register means for counting each decimal digit entered through said keyboard means, and
means responsive to a command from said keyboard means for automatically entering zeros in said register means until the setting of said counter means corresponds to said electrical binary representation, said correspondence between said counter means and said representation in synchronism with said electrical signal from said detector means serving to energize said printer means to print a decimal point.

15. In an electronic calculator for performing arithmetic functions having keyboard means for entering data and commands into said calculator,
a decimal point control system providing decimal point print synchronization and automatic decimal point alignment within the calculator comprising:
printer means for printing electrically on electrosensitive record material including a print head and means for driving said print head across said record material in one continuous movement in a reciprocating manner,
detector means for generating an electrical signal in response to detection of said printer means in a preselected position,
adjusting means for adjusting said detector means to select the position of said printer means at which said electrical signal is to be generated, including dial means for preselecting the number of decimal places desired for data entered into said calculator,
means responsive to said dial means for generating an electrical binary representation of the setting of said dial means,
register means in said calculator for storing input data,
means for shifting data into said register means in a serial manner through said keyboard means,
counter means actuated in response to introduction of decimal data into said register means for counting each decimal digit entered through said keyboard means, and
means responsive to a command from said keyboard means for automatically entering zeros in said register means until the setting of said counter means corresponds to said electrical binary representation, said correspondence between said counter means and said representation in synchronism with said electrical signal from said detector means serving to energize said printer means to print a decimal point,
said print head driving means including a driven pulley, a driving pulley, and a timing belt supported by said pulleys for rotation and carrying said print head,
said timing belt means further including magnetic shutter means secured to said driven pulley for rotation therewith along a circular path.

16. In an electronic calculator for performing arithmetic functions having keyboard means for entering data and commands into said calculator,
a decimal point control system providing decimal point print synchronization and automatic decimal point alignment within the calculator comprising:
printer means for printing electrically on electrosensitive record material including a print head and means for driving said print head across said record material in one continuous movement in a reciprocating manner,
detector means for generating an electrical signal in response to detection of said printer means in a preselected position,
adjusting means for adjusting said detector means to select the position of said printer means at which said electrical signal is to be generated, including dial means for preselected the number of decimal places desired for data entered into said calculator,
means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation, said correspondence between said counter means and said representation in synchronism with said electrical signal from said detector means serving to energize said printer means to print a decimal point, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, said magnetic switch and magnet combination comprising a reed switch having normally open contacts, and a magnet spaced from said reed switch, the contacts of said reed switch being closed by effect of the field of said magnet.

17. In an electronic calculator for performing arithmetic functions having keyboard means for entering data and commands into said calculator, a decimal point control system providing decimal point print synchronization and automatic decimal point alignment within the calculator comprising:

printer means for printing electrically on electro-sensitive record material including a print head and means for driving said print head across said record material in one continuous movement in a reciprocating manner, detector means for generating an electrical signal in response to detection of said printer means in a preselected position, adjusting means for adjusting said detector means to select the position of said printer means at which said electrical signal is to be generated, including dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter means actuated in response to introduction of decimal data into said register means for counting each decimal digit entered through said keyboard means, and means responsive to a command from said keyboard means for automatically entering zeros in said register means until the setting of said counter means corresponds to said electrical binary representation, said correspondence between said counter means and said representation in synchronism with said electrical signal from said detector means serving to energize said printer means to print a decimal point, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position.

18. In an electronic calculator for performing arithmetic functions having keyboard means for entering data and commands into said calculator, a decimal point control system providing decimal point print synchronization and automatic decimal point alignment within the calculator comprising:

printer means for printing electrically on electro-sensitive record material including a print head and means for driving said print head across said record material in one continuous movement in a reciprocating manner, detector means for generating an electrical signal in response to detection of said printer means in a preselected position, adjusting means for adjusting said detector means to select the position of said printer means at which said electrical signal is to be generated, including dial means for preselecting the number of decimal places desired for data entered into said calculator, means responsive to said dial means for generating an electrical binary representation of the setting of said dial means, register means in said calculator for storing input data, means for shifting data into said register means in a serial manner through said keyboard means, counter mens actuated in response to introduction of decimal data into said register means for counting each decimal digit entered through said keyboard means, and means responsive to a command from said keyboard means for automatically entering zeros in said register means until the setting of said counter means corresponds to said electrical binary representation, said correspondence between said counter means and said representation in synchronism with said electrical signal from said detector means serving to energize said printer means to print a decimal point, said print head driving means including a driven pulley, a driving pulley, and a timing belt supported by said pulleys for rotation and carrying said print head, said timing belt means further including magnetic shutter means secured to said driven pulley for rotation therewith along a circular path, said detector means including a magnetic switch and magnet combination for detecting said shutter means, producing an electrical output in response thereto, means for selectively positioning said detector means at any point along the path of rotation of said magnetic shutter means corresponding in time to said timing belt means positioning said print head at the decimal print position, said adjusting means including dial means calibrating the position of said detector means to the number of the decimal position at which printing of the decimal point is to occur.

19. A decimal point control system for electronic calculators providing decimal point print synchronization comprising:
- timing belt means including a driven pulley, a driving pulley, and a timing belt supported by said pulleys for rotation and carrying printing means thereon,
- magnetic shutter means secured to said driven pulley for rotation therewith along a circular path,
- detection means including a magnetic switch and magnet for detecting said shutter means, producing an electrical output in response thereto, and
- adjusting means for selectively positioning said detection means at any point along the path of rotation of said magnetic shutter means corresponding in time to said timing belt means positioning said printing means at the decimal print position.

20. A decimal point control system for electronic calculators providing decimal point print synchronization comprising:
- timing belt means including a driven pulley, a driving pulley, and a timing belt supported by said pulleys for rotation and carrying printing means thereon,
- magnetic shutter means secured to said driven pulley for rotation therewith along a circular path,
- detection means including a magnetic switch and magnet for detecting said shutter means, producing an electrical output in response thereto, and
- adjusting means for selectively positioning said detection means at any point along the path of rotation of said magnetic shutter means corresponding in time to said timing belt means positioning said printing means at the decimal print position,
- said electrical output generated by said detector means serving as a synchronizing signal for printing of said decimal point.

21. A decimal point control system for electronic calculators providing decimal point print synchronization comprising:
- timing belt means including a driven pulley, a driving pulley, and a timing belt supported by said pulleys for rotation and carrying printing means thereon,
- magnetic shutter means secured to said driven pulley for rotation therewith along a circular path,
- detection means including a magnetic switch and for detecting said shutter means, producing an electrical output in response thereto, and
- adjusting means for selectively positioning said detection means at any point along the path of rotation of said magnetic shutter means corresponding in time to said timing belt means positioning said printing means at the decimal print position,
- said magnetic switch and magnet combination comprising a reed switch having normally open contacts, and a magnet spaced from said reed switch, the contacts of said reed switch being closed by effect of the field of said magnet.

References Cited

UNITED STATES PATENTS

| | | | |
|---|---|---|---|
| 2,405,246 | 8/1946 | Watson | 179—100.3 |
| 2,815,843 | 12/1957 | Bellinger et al. | 197—20 |
| 3,080,548 | 3/1963 | Hagen | 340—172.5 |
| 3,291,276 | 12/1966 | Milne et al. | 197—1 |
| 3,300,017 | 1/1967 | Yazejian et al. | 197—1 |

PAUL J. HENON, *Primary Examiner.*

I. KAVRUKOV, *Assistant Examiner.*